United States Patent [19]

Sugiura et al.

[11] Patent Number: 4,609,538

[45] Date of Patent: Sep. 2, 1986

[54] SCRAP HEATING METHOD

[75] Inventors: Sabro Sugiura; Kiyohide Hayashi, both of Nagoya; Kenji Kanada, Chita; Noboru Demukai, Kaizu; Tetsuo Okamoto, Chita, all of Japan

[73] Assignee: Daido Tokushuko Kabushiki Kaisha, Nagoya, Japan

[21] Appl. No.: 703,363

[22] Filed: Feb. 20, 1985

[30] Foreign Application Priority Data

Feb. 23, 1984 [JP] Japan .................. 59-33243

[51] Int. Cl.$^4$ .................. B01J 8/00; C01B 17/00; C22B 1/248
[52] U.S. Cl. .................. 423/244; 75/43; 75/44 R; 75/44 S
[58] Field of Search .................. 75/44 R, 44 S, 43; 423/244 A, 244 R

[56] References Cited

U.S. PATENT DOCUMENTS

| | | | |
|---|---|---|---|
| 1,963,269 | 6/1934 | Hennig | 75/43 |
| 2,577,883 | 12/1951 | Fourmanoit | 75/43 |
| 2,643,185 | 6/1953 | Carter | 75/43 |
| 2,718,453 | 9/1965 | Beckman | 423/244 |
| 2,871,115 | 1/1959 | Agarwal | 75/44 R |
| 3,124,450 | 3/1964 | Matushkovitz et al. | 75/43 |
| 3,199,975 | 8/1965 | Matuschkovitz | 75/43 |
| 3,262,771 | 7/1966 | Ban | 75/44 R |
| 3,520,649 | 7/1970 | Tomany et al. | 423/242 |

*Primary Examiner*—Gregory A. Heller
*Attorney, Agent, or Firm*—Armstrong, Nikaido, Marmelstein & Kubovcik

[57] ABSTRACT

During the heating of scrap in a container using sulfur-containing fuels for combustion, CaO, Ca(CO)$_2$, or CaCO$_3$ powder is injected into the container to fix sulfur oxides generated during the combustion mainly as CaSO$_4$. There is no need for special exhaust gas desulfurization, and, at the same time, slag formation is possible.

3 Claims, 6 Drawing Figures

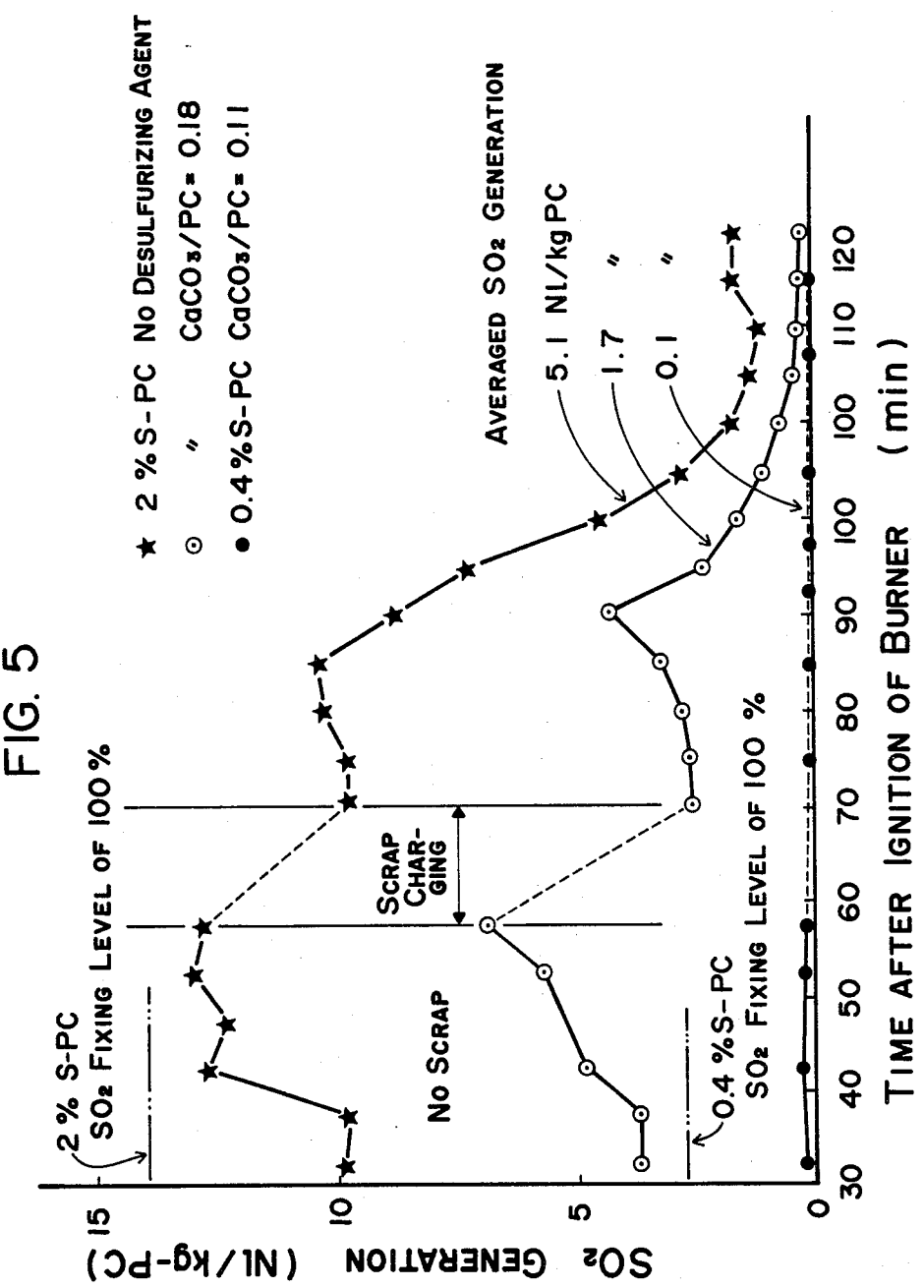

SCRAP HEATING METHOD

BACKGROUND OF THE INVENTION

1. Field of the Invention

The present invention relates to an improved method for heating scrap in which waste gas desulfurization is carried out simultaneously with slag formation.

2. State of the Art

In the manufacture of special steels primarily utilizing arc furnaces, the preparatory phase of melting the scrap using electricity is disadvantageous from a cost standpoint. It is desirable to replace at least a part of the electrical power consumption with another heating source. With such a viewpoint in mind the use of fuel oil burners and pulverized coal burners has been attempted.

However, these types of carbonaceous fuels, depending on their quality, have a large range in cost. Because low-priced fuels contain a considerable amount of sulfur there is the problem of dealing with sulfur oxides in the waste gases. Although exhaust flue gas desulfurization techniques have progressed, the construction and operating costs of the equipment are high, and, in addition, complete desulfurization is difficult to achieve.

SUMMARY OF THE INVENTION

The object of the present invention is to solve these problems, and provide in the melting of scrap a method of heating scrap which realizes exhaust gas desulfurization without entailing a special apparatus.

This object can be achieved by the present invention for heating scrap which is characterized in that the desulfurization of waste gases occurs simultaneously with slag formation.

Carbonaceous fuels containing sulfur are used to heat the scrap, and at the time of heating, CaO, Ca(OH)$_2$, or CaCO$_3$ is injected into the container holding the scrap. Sulfur oxides generated during combustion are fixed primarily as CaSO$_4$.

The ability of CaO or Ca(OH)$_2$ to absorb and fix sulfur oxides is known, but because their use involves such problems as contamination of the interior of the furnace or obstruction of gas circulation, use of these powders by direct injection into a furnace has not yet been attempted. However, during melting of the scrap, materials injected in the form of powder into the furnace are held in the scrap and a very low percentage thereof comes out with the stream of exhaust gas. The captured gas is useful as a component of the slag which is later necessary during the melting of the scrap.

When CaCO$_3$ is added, the following reaction takes place in the high temperature gas to supply CaO:

$$CaCO_3 \rightarrow CaO + CO_2$$

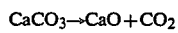

and because it fixes sulfur oxides, use of the less expensive CaCO$_3$ is possible.

BRIEF DESCRIPTION OF THE DRAWINGS

FIG. 5 is a graph showing changes in the levels of SO$_2$ generated over time, when the method according to the present invention was applied using a pulverized coal burner to heat scrap in a pre-heating container. For comparison the graph also shows SO$_2$ levels when a desulfurizing agent was not added.

DETAILED EXPLANATION OF PREFERRED EMBODIMENTS

Figure 1A:
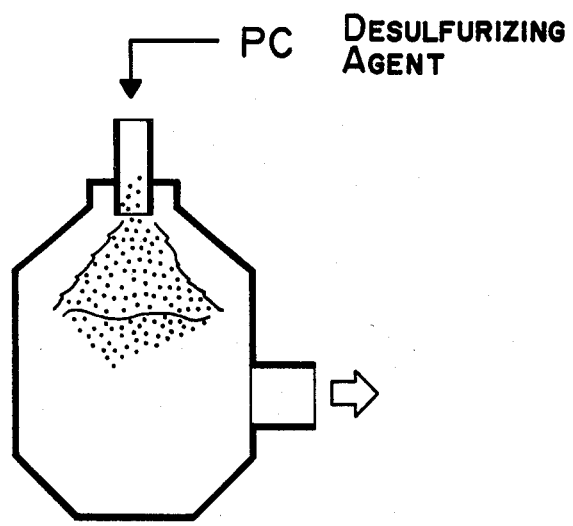
FIGS. 1A and 1B are representative drawings illustrating methods of injecting the desulfurizing agent, with 1A showing the injection, through the burner, of pulverized coal and the agent, which had previously been mixed together, and 1B showing the injection of the agent through a separate nozzle.
Figure 1B:
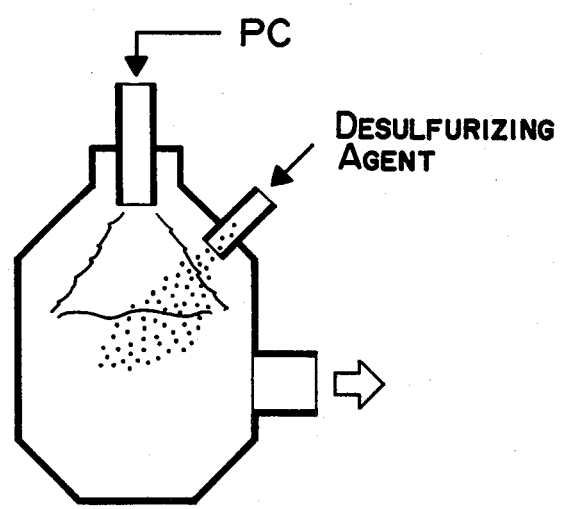

As a preparatory experiment, a pulverized coal burner was installed in the upper portion of a furnace lined with refractory materials, and pulverized coal with a 2% sulfur content was burned in the furnace. At that time, CaO (66% thereof passed through a 44$\mu$ sieve) or CaCO$_3$ (92% thereof passed through a 44$\mu$ sieve), acting as desulfurizing agents, were emmitted from the burner after having been mixed with pulverized coal, as shown in FIG. 1A, or injected into the furnace from a nozzle provided for that purpose, as shown in FIG. 1B.

Figure 2:
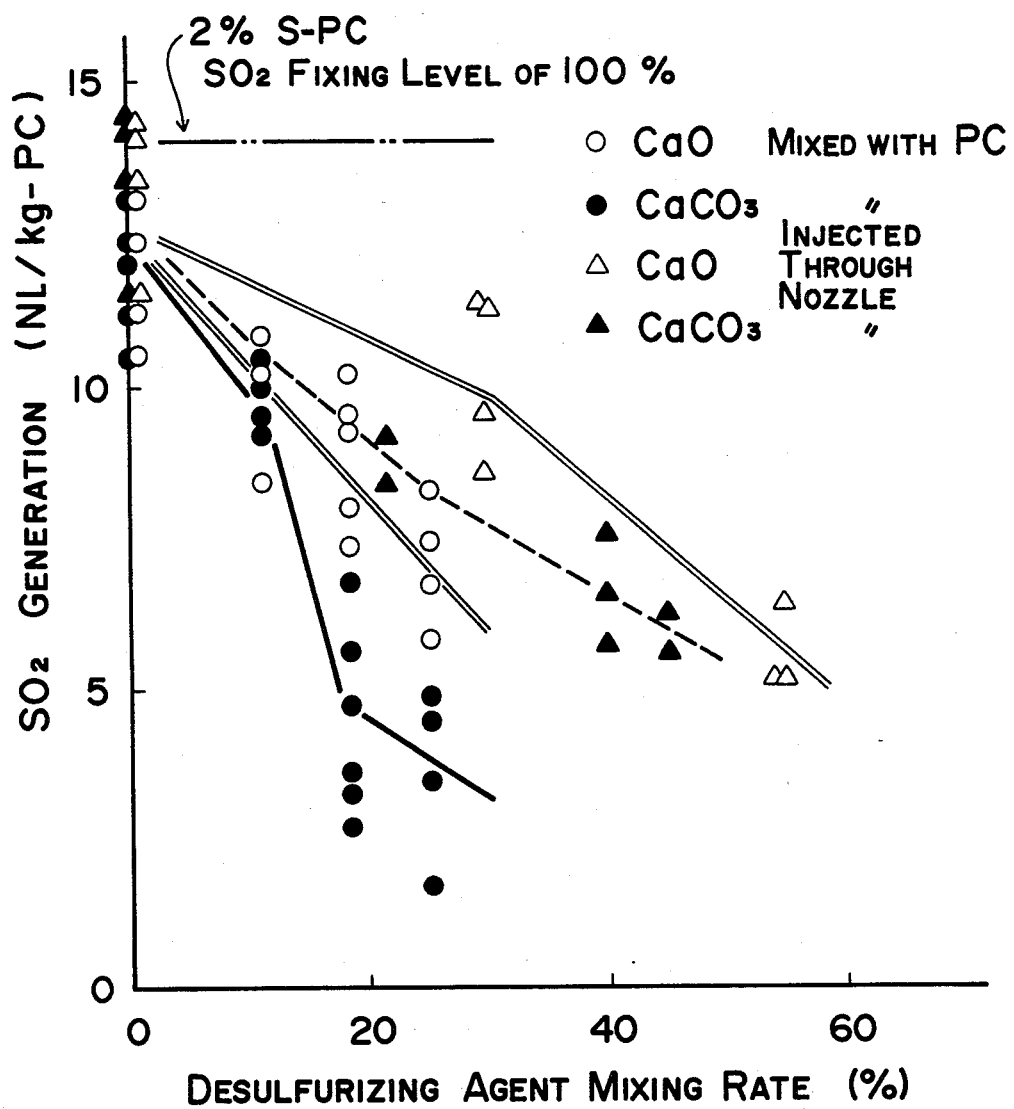
FIG. 2 is a graph showing the relationship between the degree of reduction of SO$_2$ in waste gases and the quantity of desulfurizing agent used in the preparatory experiment.

As the quantity of the desulfurizing agent was gradually increased, the level of SO$_2$ in the waste gases gradually decreased. The results are shown on the graph in FIG. 2.

The following information was obtained:

* Both CaO and CaCO$_3$ were effective. The effectiveness of CaCO$_3$ was high due to its small particle size and high reactivity.

* Direct mixing of the desulfurizing agents with the pulverized coal proved highly successful, but there appears to be room for improvement using the method of injecting the agent from a particular nozzle into the burner.

Figure 3:
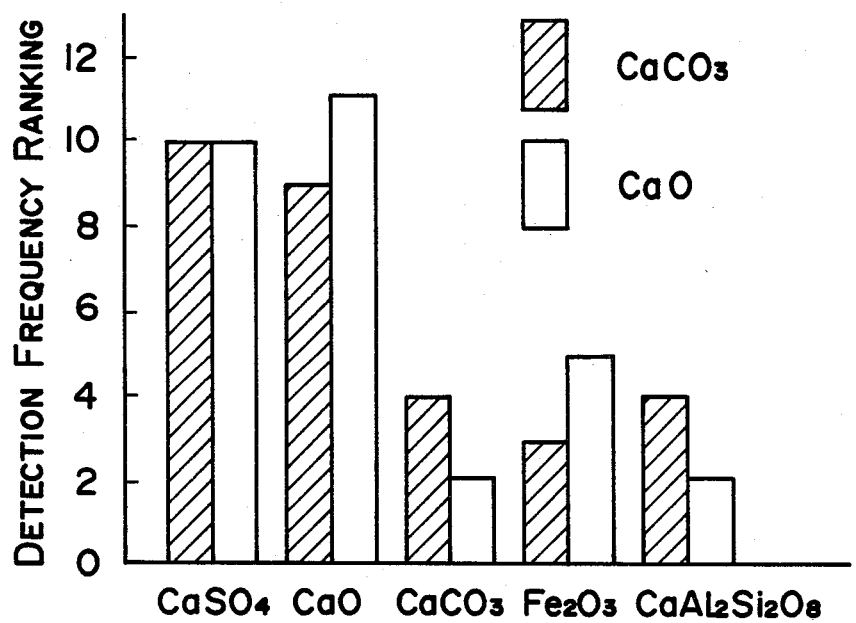
FIG. 3 is a histogram showing the results of X-ray diffraction analysis of dust formed during the above-mentioned experiment.

FIG. 3 shows the results of X-ray diffraction analysis of dust remaining in the furnace. It was concluded that the main product of the desulfurization reaction is CaSO$_4$.

From a study of the CaSO$_4$-forming reaction, or, from a chemical thermodynamic study of the absorption of SO$_2$ in the waste gas by CaO, the following conclusions were obtained.

* The reactions took place actively, over a relatively low temperature range. An optimum temperature within the scrap held in the container is about 1200° C.

* A high concentration of O$_2$ is advantageous for the reaction, but even a level of 0.5%, for example, is sufficient.

Following this, the amount of CaCO$_3$, combined with pulverized coal having 2% and 0.4% sulfur contents, respectfully, was varied, in order to determine the amount of desulfurizing agent that was required. The results are shown in FIG. 4.

Figure 4:
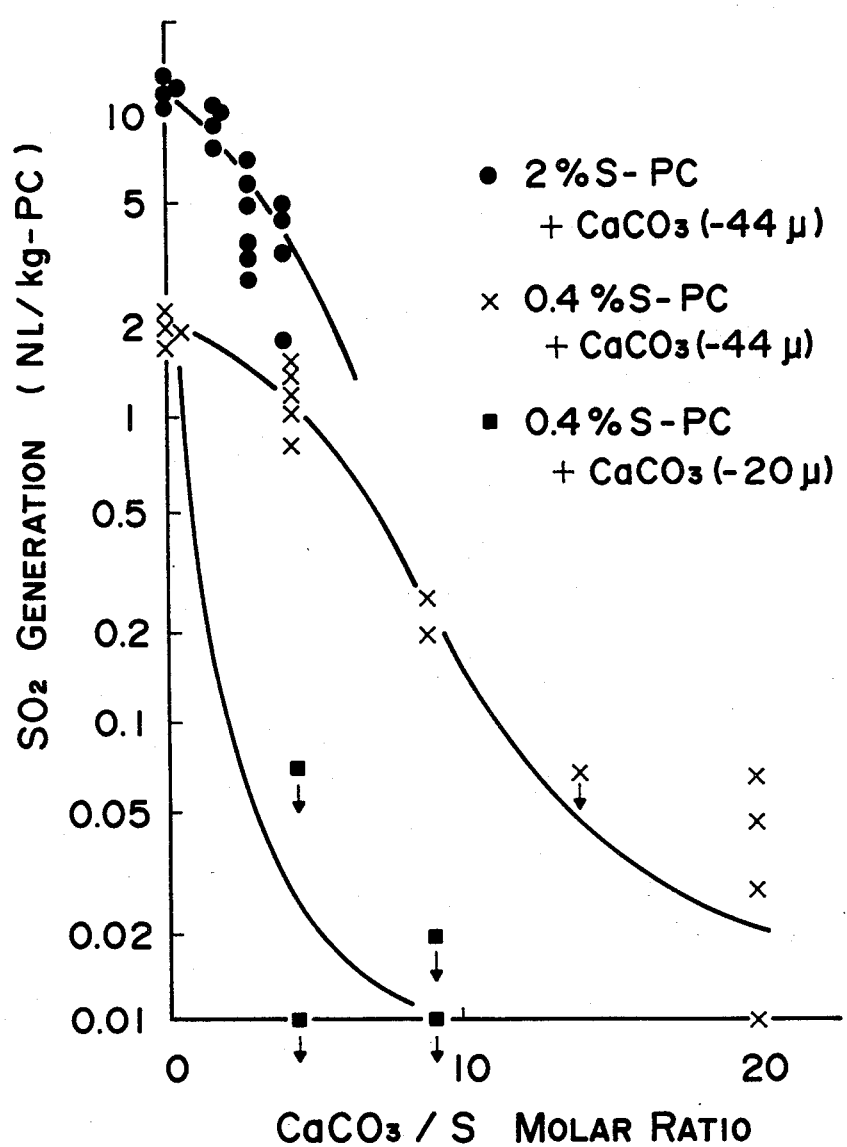
FIG. 4 is a graph showing the relationship between the efficiency of desulfurization and the amount of desulfurizing agent added to pulverized coal containing different amounts of sulfur.

In FIG. 4, 2%S-PC, for example, signifies pulverized coal with a 2% sulfur content, and CaCO$_3$ (−44$\mu$) signifies CaCO$_3$ powder with a particle diameter of 44$\mu$ or less. The CaCO$_3$ is mixed with the pulverized coal in advance.

From the graph of FIG. 4 it can be understood that if the coal contains a comparatively low amount of sulfur, $CaCO_3$ of sufficiently fine particles thoroughly desulfurizes the coal, and that if the coal has a relatively high sulfur content, when an amount of $CaCO_3$ corresponding to the increased sulfur content is injected, the desired desulfurization is obtained. Concerning the coal which contains 0.4% sulfur, it is desirable to supply $CaCO_3$ at a rate of 0.12 kg per 1 kg of coal so that CaO at a mole ratio of 10 may exist.

To support the results of the preparatory experiment, a practical test was carried out using a preheating container with a 1000 kg scrap capacity. First, the coal burner in the container was ignited, and when a high temperature had been reached the scrap was put in and heating was continued. The desulfurizing agent was mixed with the pulverized coal and supplied from the burner. The progress of $SO_2$ levels generated over time after burner ignition is shown on the graph in FIG. 5. For comparison, $SO_2$ levels generated without applying the method according to the present invention are also shown on the graph.

The graph draws attention to the decrease in $SO_2$ levels and to progress over time after charging of the scrap, even when the coal is burned without using the desulfurizing agent. This shows that Fe or FeO in the scrap has the ability to absorb $SO_2$ and that the scrap itself, if raised to a high temperature, can be expected to desulfurize.

However, with the method according to the present invention, a high degree of desulfurization conforming to environmental standards has been attained for the first time. Concerning the 2%S-PC, when $CaCO_3$ is injected at a weight ratio to the coal of 0.18%, the rate of desulfurization of the scrap during preheating reaches 88%. With low-sulfur coal, 0.4%S-PC and a $CaCO_3$ to PC weight ratio of 0.11, the rate of desulfurization is 99.6%, based on the data on the graph. This means that $SO_2$ levels in the waste gases are practically eliminated.

The present invention encompasses various embodiments. A variety of substances as noted above can be used as desulfurizing agents, but it is advantageous to use $CaCO_3$, and, as much as possible, a fine-powder $CaCO_3$. Even when the cost of reducing to a powder is taken into account, $CaCO_3$ is more economical than CaO, does not exhibit such problems as moisture absorption, and is easy to handle. The thermal value required to change $CaCO_3$ into CaO is not particularly large. For example, when mixed 20% with pulverized coal only 85 kcal/kg. of the coal are expended. When compared with a typical value of 7400 kcal/kg generated by burning a pulverized coal, this value is negligible.

These supply methods are not limited to those in which the agent is mixed with pulverized coal in advance, but may also be obtained by supplying the coal and the agent separately on carrier gases and causing them to flow together just before reaching the burner. Of course, a nozzle used exclusively to inject the agent may be used. Modifications or additions to the equipment present no problems.

The description of the method according to the present invention up to this point has concerned, but is certainly not limited to, the use of a pulverized coal burner, but applications of the present invention using oil or gas burners are also possible.

In addition to CaO or $CaCO_3$ as a slag formation agent, it is also possible to use, at the same time, $Al_2O_3$ and/or $CaF_2$.

We claim:

1. A method of melting scrap and simultaneously forming a slag, comprising:
    (a) subjecting scrap to heat generated by the combustion of a sulfur-containing fuel, in a heating container,
    (b) injecting at least one material selected from CaO, $Ca(OH)_2$, or $CACO_3$, directly into the heating container in the area where the combustion of the sulfur-containing fuel is occurring so as to fix the sulfur oxides generated during the combustion mainly as $CaSO_4$, thereby desulfurizing the exhaust gas produced from the combustion and simultaneously forming a slag.

2. A method of heating scrap according to claim 1, in which pulverized coal is used as the carbonaceous fuel, to which fine $CaCO_3$ powder is mixed therewith in advance and supplied to a burner through a carrier gas.

3. A method of heating scrap according to claim 1, in which pulverized coal is used as the carbonaceous fuel, and in which the pulverized coal and fine $CaCO_3$ powder are delivered separately on carrier gases and are made to flow together before being supplied to a burner.

* * * * *